United States Patent [19]
Ban et al.

[11] Patent Number: 4,787,749
[45] Date of Patent: Nov. 29, 1988

[54] METHOD AND APPARATUS FOR MEASURING THE THICKNESS OF A THIN FILM USING THE SPECTRAL REFLECTION FACTOR OF THE FILM

[75] Inventors: Mikichi Ban, Yokohama; Yuki Toriumi, Tokyo; Kazuhiko Hara, Yokohama, all of Japan

[73] Assignee: Canon Kabushiki Kaisha, Tokyo, Japan

[21] Appl. No.: 935,381

[22] Filed: Nov. 26, 1986

[30] Foreign Application Priority Data

Nov. 28, 1985 [JP] Japan .................. 60-267915
Nov. 28, 1985 [JP] Japan .................. 60-267916
Nov. 28, 1985 [JP] Japan .................. 60-267917
Nov. 28, 1985 [JP] Japan .................. 60-267918
Nov. 28, 1985 [JP] Japan .................. 60-267919
Jan. 17, 1986 [JP] Japan .................. 61-008627

[51] Int. Cl.$^4$ ............................ G01B 11/06
[52] U.S. Cl. ........................ 356/381; 356/382
[58] Field of Search ............. 356/381, 382, 432, 326, 356/328

[56] References Cited

U.S. PATENT DOCUMENTS 4,676,647 6/1987 Kikkawa et al. .................. 356/382

FOREIGN PATENT DOCUMENTS 1959612 6/1971 Fed. Rep. of Germany ...... 356/201
0011803 1/1983 Japan .................................. 356/381

Primary Examiner—Gene Wan
Attorney, Agent, or Firm—Fitzpatrick, Cella, Harper & Scinto

[57] ABSTRACT

A device, usable with an object having a layer, for measuring the thickness of the layer, includes a system for irradiating the object with light while changing its wavelength, the irradiating system having a light-emitting portion disposed opposed to the surface of the object, a photodetecting unit for detecting the light from the object irradiated by the irradiating system, the photodetecting unit having a light-receiving portion disposed opposed to the object, a system for detecting the thickness of the layer of the object on the basis of the detection by the photo-detecting unit, and a setting mechanism for positioning the object, relative to the light-emitting portion and the light-receiving portion, at a distance that substantially corresponds to an extremum of the quantity of light which is to be received by the light-receiving portion and which is variable with the positional relation of the object with the light-emitting portion and the light-receiving portion.

8 Claims, 12 Drawing Sheets

METHOD AND APPARATUS FOR MEASURING THE THICKNESS OF A THIN FILM USING THE SPECTRAL REFLECTION FACTOR OF THE FILM

FIELD OF THE INVENTION AND RELATED ART

This invention relates to a film thickness measuring device which is suitably usable for measuring, e.g., the thickness of a thin film layer formed on a workpiece such as a silicon wafer.

In the field of manufacture of semiconductor devices such as integrated circuits, semiconductive or silicon wafers are coated with various thin films such as photoresist film layers, oxide films, etc. Recently, it has been strongly desired to develop a device for accurately measuring the thickness of such thin films formed on substrates. One reason therefor is that, along with the recent tendency to further miniaturization of the width of lines constituting patterns of semiconductor circuit devices, higher accuracy is required in the formation of lines of the patterns. In an etching process, which is one of the semiconductor device manufacturing processes easily affected by the thickness of films formed on the wafers, the width of lines varies depending upon the thickness of the thin films.

According to conventional techniques, the thickness of such thin films formed on substrates is measured by detecting the reflectivity characteristics (spectral reflection factor) of the film being examined. In order to improve the accuracy of thickness measurement, it is necessary to increase the accuracy of the measurement of the reflectivity characteristics of the film.

Known types of thickness measuring devices are usually arranged so that thickness-measuring light is projected onto the surface of a sample having a thin film layer formed thereon. And, while changing the wavelength of the thickness-measuring light, the variation in the quantity of light reflected from the thin film layer is monitored to thereby measure the thickness of the thin film layer. Irradiation means for projecting the thickness-measuring light onto the sample and light-receiving means for receiving the light reflected from the sample are provided in the device. However, there is a possibility that the distance from the sample to these means changes due to flexion or deformation of the sample being examined, or for any other reasons. If this occurs, the quantity of light received by the light-receiving means changes, with the result that accurate measurement of the thin film thickness is not attainable.

SUMMARY OF THE INVENTION

It is accordingly a primary object of the present invention to provide a film thickness measuring device by which the spectral reflection factor can be measured with high accuracy and, therefore, the exact thickness of the film can be measured.

It is another object of the present invention to provide a film thickness measuring device which ensures that any erroneous component in the result of measurement of the spectral reflectance is excluded in the calculation of the film thickness, whereby accurate measurement of the film thickness, based on the calculation, is attained.

It is a third object of the present invention to provide a film thickness measuring device which can be easily handled by an operator and which allows measurement of the film thickness in a reduced time.

Briefly, according to one aspect of the present invention, there is provided a device, usable with an object having a layer, for measuring the thickness of the layer, the device comprising: means for irradiating the object with light while changing its wavelength, the irradiating means having a light-emitting portion disposed opposed to the surface of the object; photodetecting means for detecting the light from the object irradiated by the irradiating means, the photodetecting means having a light-receiving portion disposed opposed to the object; means for detecting the thickness of the layer of the object on the basis of the detection by the photodetecting means; and setting means for positioning the object, relative to light-emitting portion and light-receiving portion, at a distance that substantially corresponds to an extremum of the quantity of light which is to be received by the light-receiving portion and which is variable with the positional relation of the object with the light-emitting portion and the light-receiving portion.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A–1C are principle views for explicating the principle of detection of film thickness on the basis of spectral reflectance, the principle being utilized in the present invention, wherein FIG. 1A shows the action of light incident upon a film having a refractive index $n_2$; FIG. 1B is a graph showing the relation between a varying wavelength $\lambda$ and a varying reflectivity R; and FIG. 1C is a graph showing the relation between the varying wavelength $\lambda$ and the thickness detected by measurement.

DESCRIPTION OF THE PREFERRED EMBODIMENTS

Figure 1A:
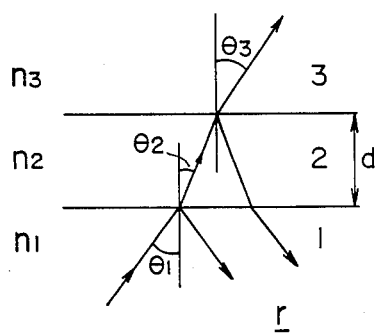

First, the principle of thickness measurement which the present invention utilizes will be described, taken in conjunction with FIGS. 1A-1C. For better understanding of this principle, reference may be made to "Principles of Optics", third edition, pages 61-66, by M. Born and E. Wolf, published by PERGAMON PRESS.

It is now assumed that mediums 1-3 have refractive indices $n_1$, $n_2$ and $n_3$, respectively, and light is incident from the medium 1 side. It is also assumed that a thin film to be examined is composed of the medium 2 and thus has a refractive index $n_2$. The thickness of the film, which is the subject of measurement, is denoted by d in FIG. 1. The light of a wavelength (wavelength $\lambda_0$ in vacuum) used for the thickness measurement defines angles $\theta_1$, $\theta_2$ and $\theta_3$ at the interfaces of the media 1-3. In this case, an amplitude reflectance r is given by the following equation:

$$r = \frac{r_{12} + r_{23}e^{2i\beta}}{1 + r_{12}r_{23}e^{2i\beta}} \quad (1)$$

wherein $r_{12}$ is a coefficient associated with the reflection at the interface between the media 1 and 2, and $r_{23}$ is a coefficient associated with the reflection at the interface between the media 2 and 3. These coefficients are easily determined once the media are determined. The character "e" denotes an exponential function and the character "i" denotes an imaginary number. Also, $$\beta = \frac{2\pi}{\lambda_0} n_2 d \cos\theta_2$$

What is actually detectable is the intensity of reflected light, i.e. $R = |r|^2$, which is usually called "reflectivity". The reflectivity R is expressed as follows:

$$R = \frac{r_{12}^2 + r_{23}^2 + 2r_{12}r_{23}\cos2\beta}{1 + r_{12}^2 r_{23}^2 + 2r_{12}r_{23}\cos2\beta} \quad (2)$$

From equation (2), the thickness d can be given by the following equation:

$$d = \frac{\lambda_0}{4\pi n_2 \cos\theta_2}\left[2\pi N + \cos^{-1}\frac{R + Rr_{12}^2 r_{23}^2 - r_{12}^2 - r_{23}^2}{2r_{12}r_{23}(1 - R)}\right] \quad (3)$$

wherein N is an integral number which represents the order of interference fringe that appears, at the film surface, as a change in the intensity of reflected light. It is seen from equation (3) that the thickness d is determinable from equation (3) once the reflectivity R and the value of N are determined. As will be described later in detail, the reflectivity R is detected by measurement, while the value of N is detected by calculating approximate thickness of the film being examined.

Figure 1B:
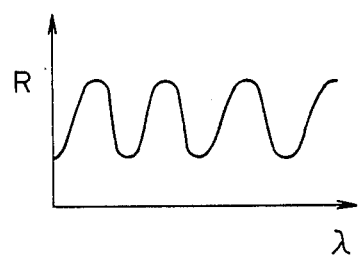
Figure 1C:
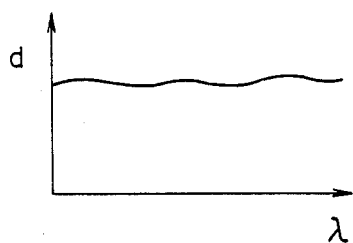

FIG. 1B shows the reflectivity R which varies with varying wavelength $\lambda_0$ used. FIG. 1C shows the thickness d obtained by measurement using varying wavelengths. As illustrated in FIG. 1C, usually the values of the thickness d obtained with respect to different wavelengths are not constant. In view of this, an average $d_{AV}$ is calculated from the values for the thickness d. More specifically, first the reflectivity R is detected with respect to each of different wavelengths, and each of the values for the reflectivity R is substituted into equation (3). By this, values for the thickness d with respect to the different wavelengths are obtained. Thereafter, an average $d_{AV}$ is determined from the values for the thickness d. By doing so, the thickness of the film can be measured with high accuracy and with good reproducibility.

The present invention uses the principle of thickness measurement described above.

A description will now be provided of a thickness measuring device according to one embodiment of the present invention.

Figure 2:
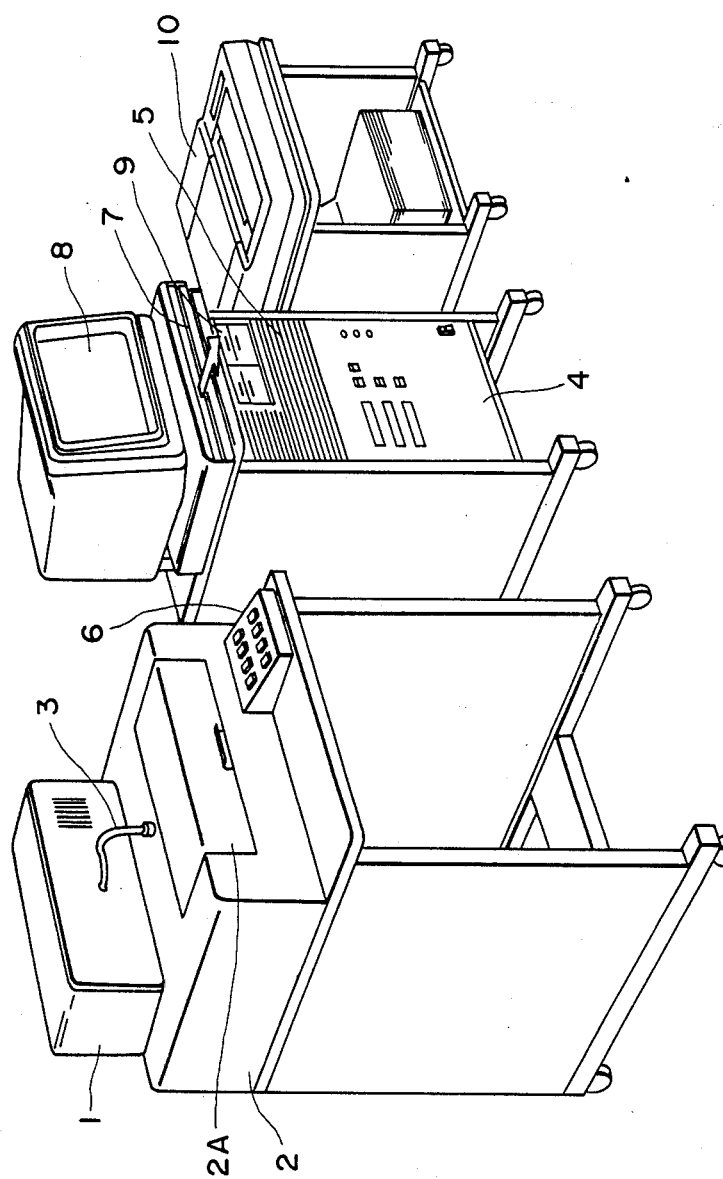
FIG. 2 is a perspective view showing an appearance of a film thickness measuring device according to one embodiment of the present invention.
Figure 3A:
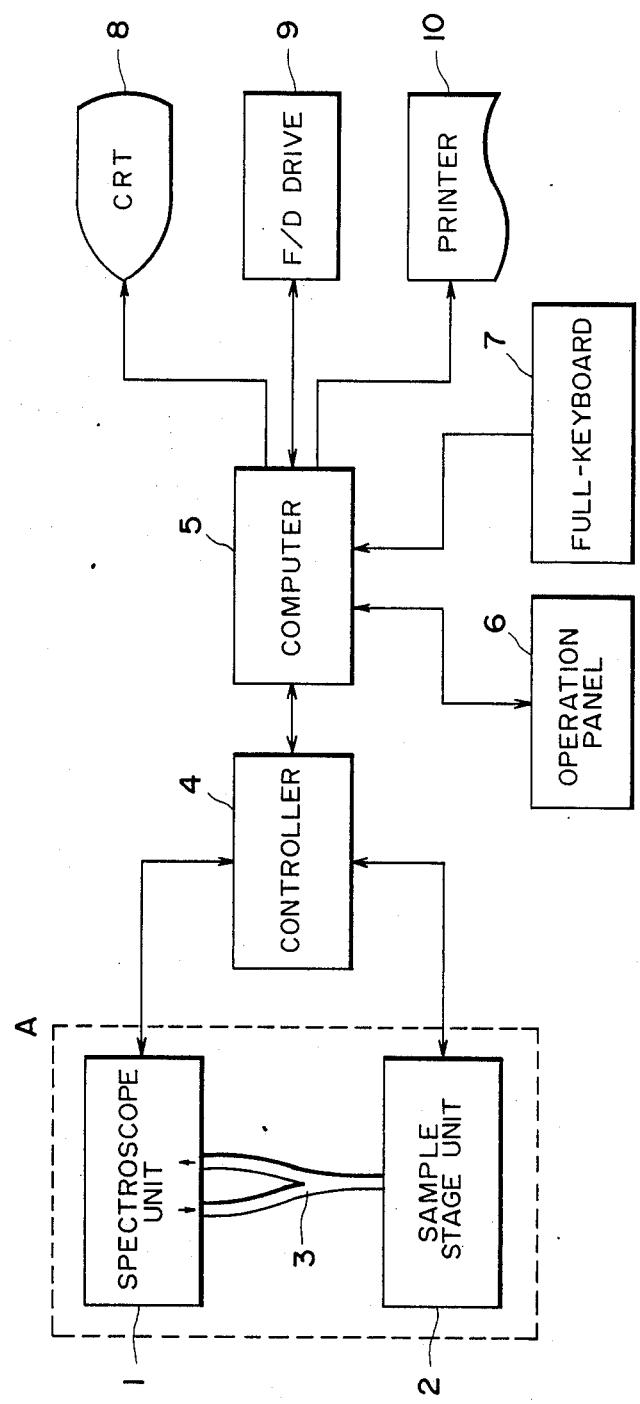
FIG. 3A is a block diagram showing the structure of the film thickness measuring device of FIG. 2.
Figure 3B:
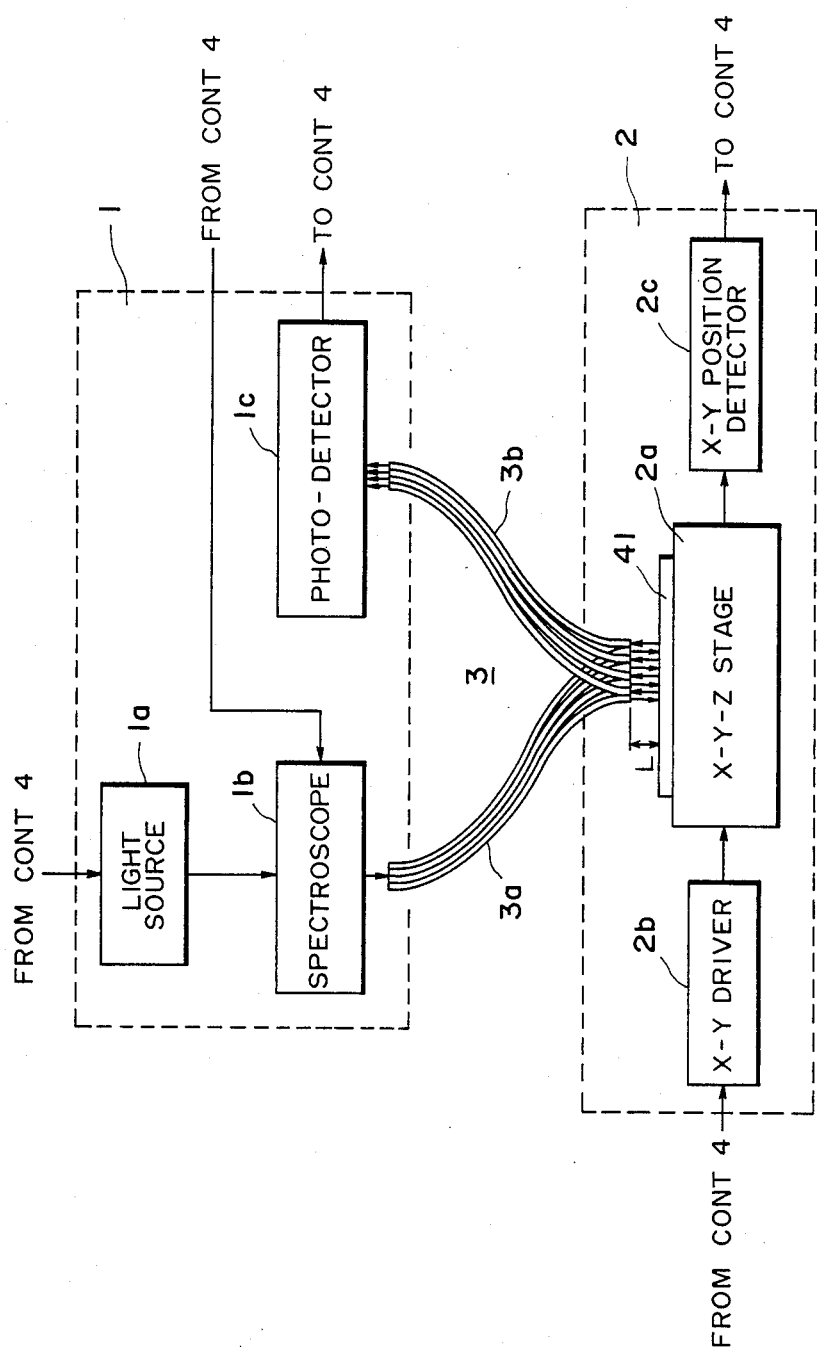
FIG. 3B is a schematic and diagrammatic view showing details of a spectroscope unit and a sample stage unit of the system of FIG. 3A.
Figure 4:
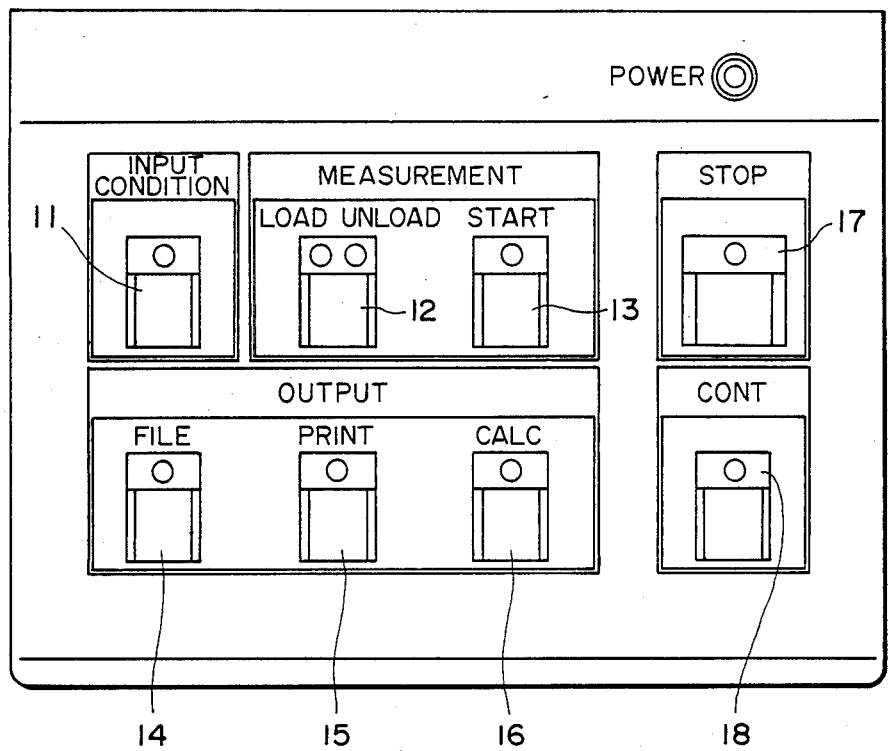
FIG. 4 is an enlarged, top plan view showing an appearance of an operation panel of the film thickness measuring device of the FIG. 2 embodiment.

Referring to FIGS. 2-4, the device includes a spectroscope unit 1 having a light source 1a for producing a light beam and a spectroscope 1b of known type adapted to separate the light from the light source 1a into different wavelength components. The device further includes a sample stage unit 2 having a stage 2a which is movable in two orthogonal X and Y directions contained in a horizontal plane, and in a Z direction perpendicular to the X-Y plane. A sample such as a wafer 41 is placed on the stage 2a. The device further includes a fiber probe 3 comprising a forked bundle of optical fibers. These optical fibers are functionally classified into two groups: one is a group 3a for illuminating the sample 41 and the other is a group 3b for receiving light reflected from the sample. Thus, the fiber probe 3 is adapted to irradiate, each time, a predetermined portion of the sample 41 surface with the light of a single wavelength or a very narrow wavelength range transmitted by means of the illuminating optical fibers 3a. Also, the fiber probe 3 is adapted to receive, at the tip ends of the light-receiving optical fibers 3b, the light reflected from the surface of the sample 41. The light received by the fiber probe 3 is transmitted to a photoelectric converting element 1c provided in the spectroscope unit 1, whereby it is converted into an electrical signal. A controller 4 is provided to control the spectroscope 1b so as to set the wavelength component to be used for the illumination of the sample 41 surface. Also, the controller 4 is arranged to control an X-Y driver 2b which is provided in the stage unit 2 so as to move the stage 2a in each of the X and Y directions. The position of the stage 2a is detected by an X-Y position detector 2c. On the basis of the detection by the position detector 2c, the controller 4 controls the driver 2b to thereby control the position of the stage 2a. Further, the controller 4 is arranged to receive an output of the photodetector 1c to convert it into a digital signal. A computer 5 is provided to control the operation of the controller 4. Also, the computer 5 receives the digital signal from the controller 4 and processes it to detect the reflectivity R. Then, the computer 5 calculates the film thickness d in accordance with the above-described equation (3). The data obtained by the calculation is outputted from the computer 5 to a display device such as, e.g., a cathode ray tube (CRT) 8, a floppy disc drive 9 or a printer 10.

By use of an operation panel 6 and a full-keyboard 7 of retractable type, various conditions such as refractive indices are specified in the computer 5. Also, the wavelength to be extracted by the spectroscope 1b and the amount of movement of the stage 2a for the sake of plural-point measurement are designated from the operation panel 6 and/or the keyboard 7. Further, instructions such as a command of initiation of measurement are supplied to the computer 5 from the operation panel 6 and/or the keyboard 7. The operation panel 6 is provided to be used by an operator where the measurement is to be performed under frequently used conditions. For this purpose, the operation panel 6 is provided with a minimum number of keys necessary for executing such measurement, in order to prevent mishandling by the operator. FIG. 4 is a top plan view of the operation panel 6. When, for example, an "INPUT CONDITION" key 11 is depressed, the data concerning various conditions preparatorily stored in a floppy disc is read out by the floppy disc drive 9 (FIG. 2) so that it is supplied to the computer 5. When a "LOAD/UNLOAD" key 12 for measurement instruction is depressed, the sample placed on the stage 2a is fixedly held thereon by vacuum suction or the like. When the key 12 is pressed again, unloading of the sample is instructed so that it is released from the stage 2a. When a "START" key 13 is pressed, the measurement starts. Where, after completion of measurement, it is desired to store the results of measurement in the floppy disc, the operator presses a key "FILE" key 14 for output instructions. By this, means the floppy disc drive 9 is actuated. Where it is desired to output the results of measurement by the printer 10, the operator presses a "PRINT" key 15. Where it is desired to subject the results of measurement to specific calculation processing such as, for example, calibration with any other thickness measuring device, the operator presses a "CALC" key 16. A "STOP" key 17 is an emergency stop key for stopping the measurement if necessary. A "CONT" key 18 is provided to instruct resumption of the measurement. By use of these eight keys, the measurements under ordinary conditions can be performed. However, in order to specify or designate particular conditions by use of characters and/or numerals, the full-keyboard 7 is conveniently provided. Of course, all the key-functions of the operation panel 6 are attainable at the keyboard 7.

The outline of the measuring operation of the thickness measuring device of the present embodiment will now be described taken in conjunction with a flow chart of FIG. 5.

At step 19, the device starts so that the components of the device are powered and are initially set. At step 20, the sample is loaded whereby it is fixedly held on the stage 2a. Step 21 is provided for the sake of designation of various conditions such as refractive indices of the layers (of the media) of the sample. Where the measurement is to be repeatedly executed under constant conditions, the step 21 is skipped. At step 22, the measurement starts. First, at step 23, the sample is moved so that a first predetermined portion of the sample 41 surface is placed at the measuring position. Then, the spectral reflectance is measured (step 24). When the data concerning the detected spectral reflectance is transmitted to the computer 5 from the controller 4, the computer 5 actuates the controller 4 to cause it to supply an instruction signal to the driver 2b to move the sample so that a second predetermined portion of the sample surface is placed at the measuring position. Then, the spectral reflectance at that portion is measured. Simultaneously with the movement of the stage 2a and the measurement of the spectral reflectance, the computer 5 operates to calculate the thickness of the film, being examined, with respect to the first measuring point thereon on the basis of the spectral reflectance data supplied from the controller 4 (step 25). Details of this calculation will be described later. By executing the thickness calculation with respect to the first measuring point in parallel with the measurement of the spectral reflectance at the second measuring point, the overall measurement time can be reduced. The above-described operations are repeated until the thickness measurement with respect to all the predetermined measuring points on the sample is completed. Thereafter, at step 26, the thickness data concerning all the measuring points are collected. For example, an average thickness or standard deviation is calculated. The result of this calculation is displayed on the CRT 8 and also is outputted from the printer 10, as desired. Also, the data is inputted into the floppy disc drive 9, as desired. If necessary, the thickness data is subjected to a specific calculation such as, for example, calibration with the measurement data obtained by any other thickness measuring device (step 28). By this, means the thickness data obtained at step 26 is calibrated, the result of which is displayed on the CRT 8 (step 29). If it is desired to execute the measurement again for the same sample, the sequence goes back to step 2. If it is desired to change any of the conditions such as the measuring point, the sequence goes back to step 21.

After completion of measurement, the sample is unloaded (step 30). If another sample is to be examined, the sequence goes back to step 20. Where the operation is to be brought to an end, the sequence goes to step 31 whereby the components of the device are de-energized.

Figure 6:
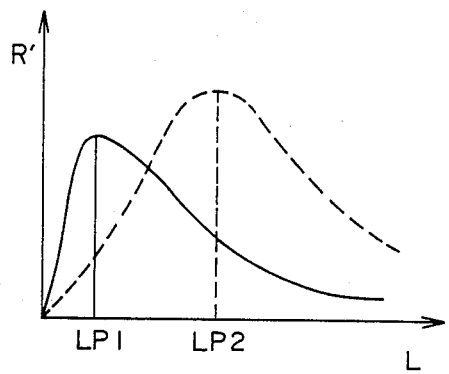
FIG. 6 is a graph showing the intensity of light (R') received by a fiber probe, being plotted with respect to a varying distance (L) between a tip end of the fiber probe and the surface of a sample.
Figures 7A, 7B:
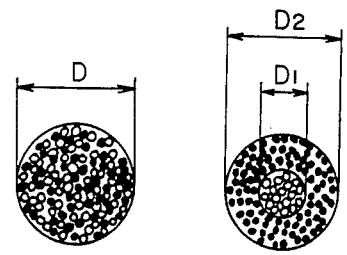
FIGS. 7A and 7B are enlarged end views, respectively, showing different examples of the structure of the fiber probe.

Referring now to FIGS. 6, 7A and 7B, the details of the structure of the fiber probe 3 will be described.

FIGS. 7A and 7B are enlarged end views, respectively, showing different examples of the structure of the fiber probe 3. In these Figures, a number of minute circles denote optical fibers 3a having tip ends from which the light irradiating the sample emerges. On the other hand, a number of small dots denote optical fibers 3b having tip ends for receiving the light reflected from the sample. In the case of FIG. 7A, the light-emitting fibers 3a and the light-receiving fibers 3b are disposed mixedly or irregularly in one bundle. Hereinafter, the fiber probe of the FIG. 7A example will be referred to also as an "irregular fiber probe". In the case of FIG. 7B, as compared therewith, the light-emitting fibers are disposed in an inner, substantially circular region of the bundle while the light-receiving fibers are disposed in an outer circumferential region around the inner region. Hereinafter, the fiber probe of the FIG. 7B example will be referred to also as a "regular type fiber probe".

FIG. 6 shows the characteristics of the irregular type fiber probe and the regular type fiber probe of FIGS. 7A and 7B. More specifically, FIG. 6 shows the intensity of light reflected from the sample surface and entering the photoelectric converting element $1c$ by way of the fiber probe 3, i.e. the intensity of the reflected light denoted by R', where the intensity of light emitted from the spectroscope $1b$ and transmitted by the fiber probe 3 is constant. The intensity R' of reflected light is plotted in FIG. 6 with respect to a varying distance L between the tip end of the fiber probe 3 and the surface of the sample 41. It is seen from FIG. 6 that, depending on the type of the fiber probe used, the characteristic of picking up the reflected light differs. More specifically, the solid-line curve in the graph of FIG. 6 is concerned with the irregular type fiber probe shown in FIG. 7A, while the broken-line curve is concerned with the regular type fiber probe of FIG. 7B. For a constant intensity of light incident, the irregular type fiber probe shows a peak or an extremum at a smaller distance LP1, whereas the regular type fiber probe of FIG. 7B shows a peak or an extremum at a larger distance LP2. This is chiefly because, if, in the case of irregular type, the distance L is large, the light emitted from outer optical fibers goes, after being reflected by the sample, outwardly of the tip end of the fiber probe with the result that the quantity of light received by the fiber probe is decreased, whereas in the case of regular type, the light-receiving fibers disposed around the light-emitting fibers can receive a larger quantity of reflected light. From the viewpoint of avoiding inadvertent contact between the end face of the fiber probe and the surface of the sample, the regular type of FIG. 7B is preferred since it allows use of a larger distance L for accurate measurement.

The distance L is variable depending on the straightness of the stage, the unevenness of the thickness of the sample, the flexion of the sample, and the like. In view of this, according to the present invention, the interval between the sample and the end face of the fiber probe is set at the distance LP1 (in the case of irregular type shown in FIG. 7A) or the distance LP2 (in the case of regular type shown in FIG. 7B). In other words, the end face of the fiber probe is positioned, relative to the sample, at a distance corresponding to an extremum or the portion in the neighborhood of the extremum. In this portion, the intensity R' is sufficiently high and, also, does not change so rapidly with the change in the distance L. Therefore, by setting the interval at the distance LP1 or LP2, or in the vicinity thereof, accurate measurement of the spectral reflectance is stably attainable over the entire surface of the sample. In the present embodiment, the fiber probe of the FIG. 7A example had a diameter D of approx. 2 mm and the distance LP1 was approx. 0.5 mm. The fiber probe of the FIG. 7B example had an inner diameter D1 of approx. 2 mm and an outer diameter D2 of approx. 7 mm, and the distance LP2 was approx. 7 mm.

Figure 8:
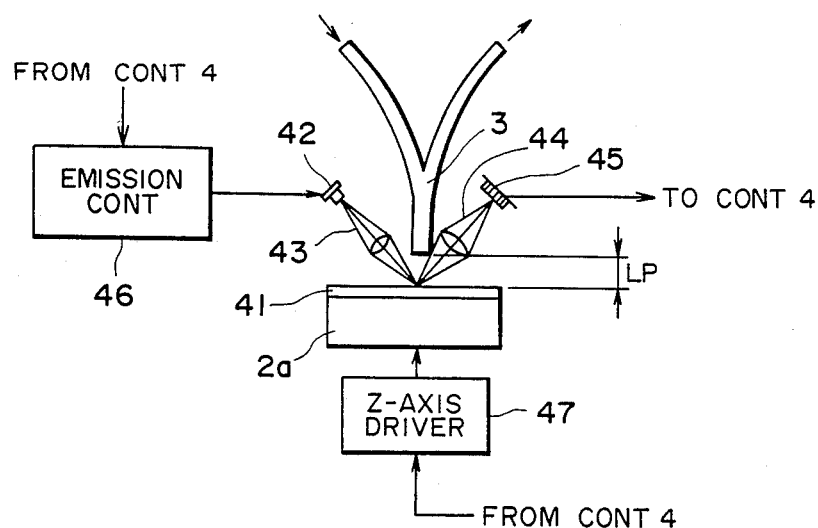
FIG. 8 is a schematic and diagrammatic view of a mechanism for automatically maintaining an optimum distance between the fiber probe and the sample being examined.

Referring now to FIG. 8, a description will be provided of a mechanism for automatically adjusting the distance L between the sample and the end face of the fiber probe.

As shown in FIG. 8, the mechanism includes a light-emitting diode 42 for emitting light and a lens 43 for focusing the light from the diode 42 upon the surface of the sample 41. The lens 43 has an optical axis which is inclined with respect to the sample 41. The mechanism further includes a lens 44 having an optical axis oppositely inclined and a line sensor 45 comprising charge coupled devices. The light reflected by the sample 41 is focused by the lens 44 upon the line sensor 45. The line sensor 45 is disposed so that the array or arrays of the charge coupled devices extend in an direction in which the chief ray of the reflected light from the sample 41 displaced with the displacement of the sample in the vertical direction (Z direction). Thus, the position of the surface of the sample 41 in the Z direction is detectable from the output of the line sensor 45. The above-described position detecting means is held in a fixed positional relation with the tip end portion of the fiber probe. The mechanism further includes a Z driver 47 for moving the sample 41 in the Z direction relative to the fiber probe 3 so that an optimum distance LP is set between the sample 41 and the fiber probe 3. The output of the line sensor 45 is supplied to the controller 4 and, on the basis of which, the controller 4 controls the Z-axis driver 47.

In order to prevent the position detecting light of the position detecting means from adversely affecting the thickness measuring light from the fiber probe 3, the emission of light from the diode 42 and the emission of light from the fiber probe 3 are controlled in a time sharing fashion. That is, at the time of position detection, the light source $1a$ is de-energized while the diode 42 is energized. At the time of measurement of the reflectivity, the light source $1a$ energized while the diode 42 is de-energized. Such energization/de-energization of the light source $1a$ is controlled by the controller 4. Also, the energization/de-energization of the diode 42 is controlled by the controller 4 with the aid of an emission controlling circuit 46. It is a possible alternative that completely different wavelengths are used for the position detection and the measurement of the reflectivity. That is, a light emitting diode capable of producing light of a wavelength which is completely different from that of the light emitted from the fiber probe 3, may be used. In such case, the sensor 45 is replaced by another having a sensitivity to the wavelength of light from the diode.

Further, the position detecting system as a whole may be replaced by a position detecting system using air-sensors or a supersonic measuring system. Moreover, movement of the stage may be replaced by displacement of the fiber probe.

It is to be noted that, in the measuring device of the present invention, it is not always necessary to provide the mechanism 47 for automatically moving the sample in the Z direction. Namely, the height of the stage $2a$ relative to the fiber probe 3 may be preparatorily set at the optimum distance LP1 or LP2 (FIG. 6). In such case, suitable means is preferably provided so as to substantially prevent vibration of the sample 41 in the Z direction. Currently available silicon wafers have a thickness which is usually of a tolerance of approx. ±0.1 mm. Therefore, by simply holding the sample by means of a chuck, the surface of the sample can be set at the distance LP1 or LP2 from the end face of the fiber probe.

Figure 5:
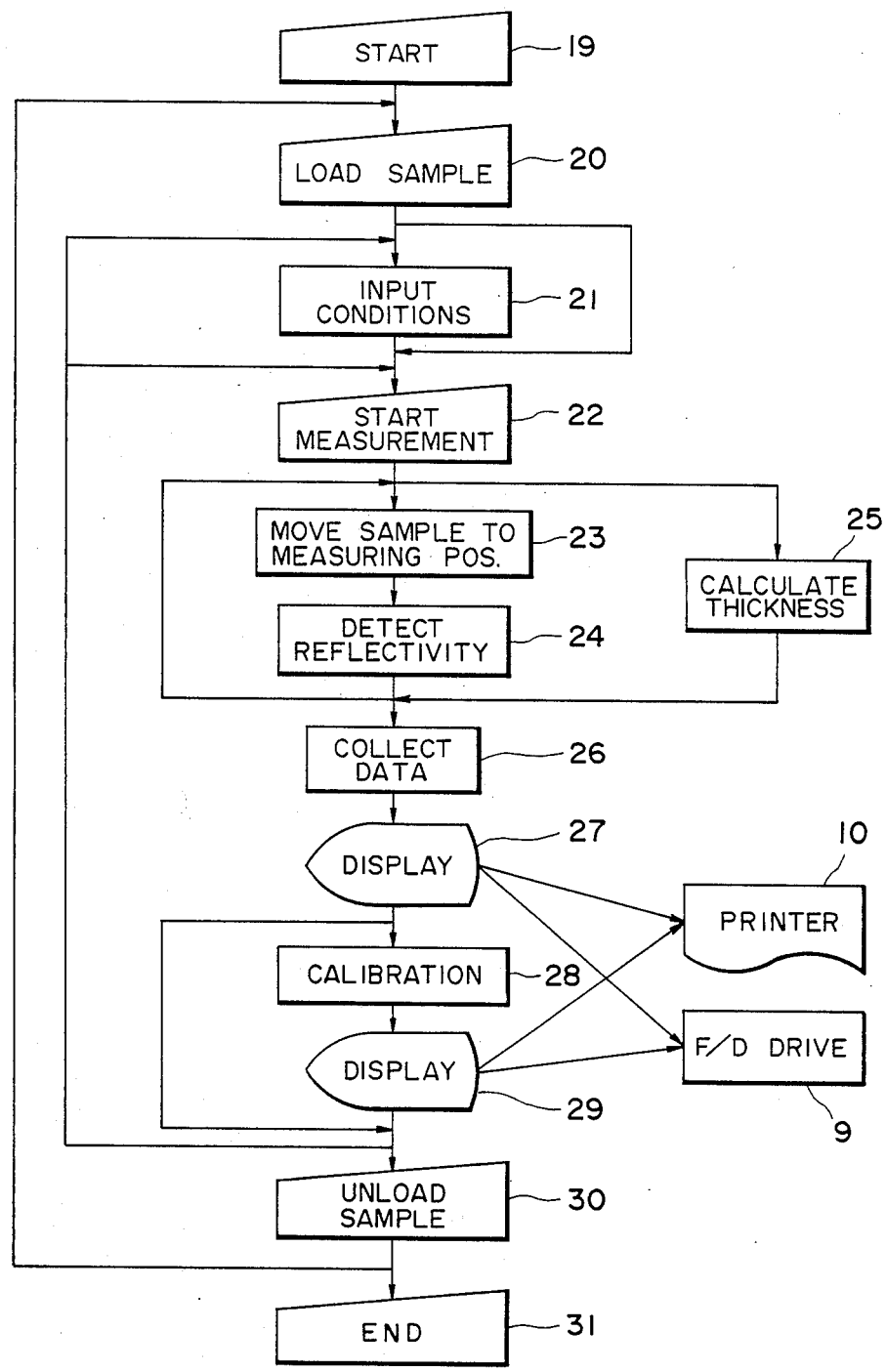
FIG. 5 is a flow chart showing the manner of thickness measurement in the film thickness measuring device of the FIG. 2 embodiment.

A description will now be provided of the manner of calculation of the film thickness at step 25 in FIG. 5.

As described hereinbefore, the calculation is made by the computer 5 (FIG. 3A). The film thickness d is computed according to equation (3) set forth in the foregoing. However, in order to use equation (3), it is necessary to determine the value of "N". To detect "N", the approximate thickness of the film is calculated by use of an extremum or extrema of the measured spectrum reflectance. This is known in the art to which the present invention pertains.

First, the manner of detecting the extremum or extrema will be described. It is assumed that the thickness of a film which is formed on a substrate is to be measured. When the film is called "first layer" and the substrate is called "second layer", the spectral reflectance of the film is given by the following equation:

$$R = \frac{\rho_{01}^2 + \rho_{12}^2 + 2\rho_{01}\rho_{12}\cos(-\phi_{01} + \phi_{12} + 2\delta)}{1 + \rho_{01}^2\rho_{12}^2 + 2\rho_{01}\rho_{12}\cos(\phi_{01} + \phi_{12} + 2\delta)} \quad (5)$$

wherein $\rho_{01}$ is an amplitude coefficient associated with the interface between the first layer and an ambient air; $\phi_{01}$ is a phase coefficient associated with the interface between the first layer and the ambient air; $\rho_{12}$ is an amplitude coefficient associated with the interface between the first layer and the second layer; $\phi_{12}$ is a phase coefficient associated with the interface between the first layer and the second layer; and $\delta$ is the term concerning the phase and is expressed as $\delta = 2\pi n d/\lambda$.

The above-described equation (5) is similar to equation (2) set forth in the foregoing. However, equation (5) is derived by taking into account the change in phase at the interface which is per se known. Such a phase change is included in equation (5) at $\phi_{01}$ and $\phi_{12}$. In place of equation (5), equation (2) may of course be used. The coefficients in equation (5) are determined once the media of the first and second layers are determined.

In equation (5), the term cosine has a value which is in a range from "−1" to "1". Therefore, the maximum Rmax of the spectral reflectance is expressed as follows:

$$Rmax = \frac{\rho_{01}^2 + \rho_{12}^2 + 2\rho_{01}\rho_{12}}{\rho_{01}^2 + \rho_{12}^2 + 2\rho_{01}\rho_{12}}$$

On the other hand, the minimum Rmin is expressed as follows:

$$Rmin = \frac{\rho_{01}^2 + \rho_{12}^2 - 2\rho_{01}\rho_{12}}{\rho_{01}^2 + \rho_{12}^2 - 2\rho_{01}\rho_{12}}$$

Thus, the maximum reflectivity and the minimum reflectivity can be determined theoretically from the properties of the media constituting the layers, independently of the film thickness d. This is well known in the art to which the present invention pertains.

On the other hand, a certain material whose spectral reflectance is known is preparatorily used and the intensity of light reflected by such material with respect to the varying wavelength is preparatorily measured by the measuring device of the present embodiment. Further, the digital signals from the controller 4 produced in response to the actual measurement of the reflectivities of that material are preparatorily calibrated with respect to the known spectral reflectance. Therefore, at the time of actual film thickness measurement, the digital signals from the controller 4 obtained with respect to the varying wavelength can be easily used as the reflectivities, by calibration.

Figure 9:
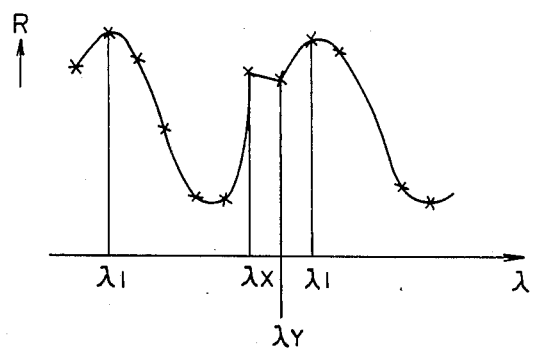
FIGS. 9–13 are graphs showing examples of detected spectral reflectance.
Figure 10:
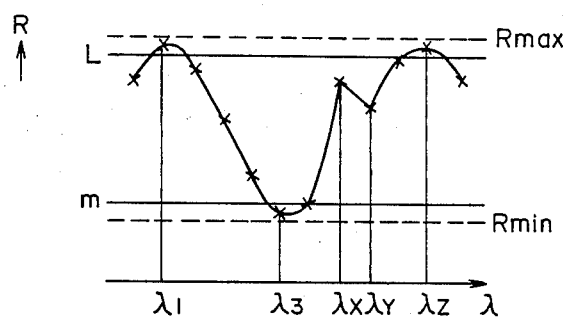
Figure 11:
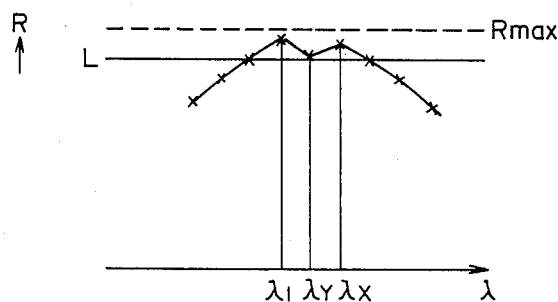

It is possible that the spectral reflectance curve obtained by measurement contains one or more false extrema. In view of this, according to the present embodiment, discrimination is made of the maximum and minimum. More spectifically, only when a maximum detected on the basis of results of measurement is not less than a predetermined value set with respect to Rmax, it is discriminated as being one "maximum". Also, only when a minimum detected on the basis of the results of measurement is not greater than a predetermined value set with respect to Rmin, it is discriminated as being one "minimum". This will now be described in more detail.

Where the spectral reflectance curve obtained by the measurement contains an error at a middle portion thereof, such as illustrated in FIG. 9, and if detection of any extremum is executed directly to the spectral reflectance curve, the wavelengths $\lambda_1$, $\lambda_X$ and $\lambda_2$ are determined as those providing maxima, while the wavelengths $\lambda_3$ and $\lambda_Y$ are determined as those providing minima. In this example, the reflectivities provided by the wavelengths $\lambda_X$ and $\lambda_Y$ are not the extrema. Accordingly, in the present embodiment, a certain range L is set with respect to Rmax, such as illustrated in FIG. 10. For example, $L = Rmax \times 0.9$. And, only when a particular reflectivity is greater than the predetermined value L, it is discriminated as being a "maximum". By doing so, only the wavelengths $\lambda_1$ and $\lambda_2$ are determined as those providing the maxima. Similarly, with regard to the minimum, a certain range m is set with respect to Rmin. For example, $m = Rmin \times 1.1$. By doing so, only the wavelength $\lambda_3$ is determined as one providing the minimum. The values L and m are determined in accordance with the pitch of measurement, minimize errors which are expected in the measurement by a particular measuring device, etc.

Where the spectral reflectance measured is such as shown in FIG. 11, an extremum corresponding to the wavelength $\lambda_Y$ is excluded in the manner described hereinbefore. Therefore, only the wavelengths $\lambda_1$ and $\lambda_X$ are determined as those providing maxima. However, in periodic functions such as the spectral reflectance of the film, maxima and minima should theoretically exist alternately. For this reason, it is not possible that two maxima are juxtaposed with each other. In view of this, according to the present embodiment, a larger one of such two maxima of the reflectivities corresponding to the wavelengths $\lambda_1$ and $\lambda_X$, is selected or discriminated as being a "maximum".

Figure 12:
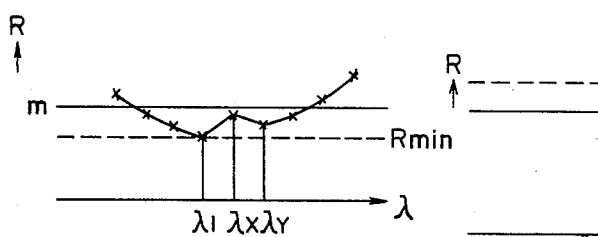
Figure 13:
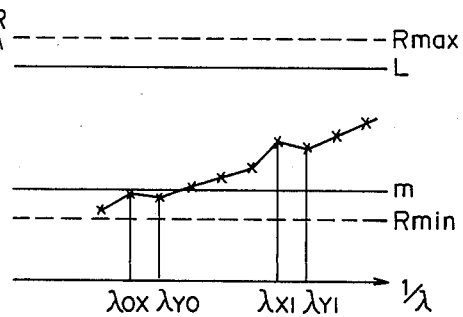

FIG. 12 illustrates discrimination of a minimum. Similar to the case of discrimination of the maximum, described with reference to FIG. 11, the reflectivity corresponding to the wavelength $\lambda_1$ can be discriminated as being the minimum. It will be readily understood that, in the case of discrimination of minimum, the smaller one of extrema is selected or discriminated as being the minimum. In the case of FIG. 12, the pitch of measurement is fine as compared with the positions of extrema. Therefore, only a small error will be caused in the calculation of the film thickness.

Where the film thickness to be examined is very small, no extremum is theoretically contained within the range in which the wavelength is changed. In such case, however, if any error is caused in the measurement of the reflectivities, one or more extrema are detected, such as illustrated in FIG. 13. In the case of FIG. 13, the wavelengths $\lambda_{X0}$, $\lambda_{X1}$ and $\lambda_{Y1}$ can be excluded in the manners described before. However, the wavelength $\lambda_{Y0}$ remains as one providing a minimum. In view of this, in the present embodiment, the following discrimination is made. That is, if the reflectivity defined by the wavelength $\lambda_{Y0}$ is a "true" extremum, the spectral reflectance curve should have portions at the opposite sides of the reflectivity corresponding to the wavelength $\lambda_{Y0}$, which portions have different signs of inclination. In the case of FIG. 13, the average inclination of a portion of the spectral reflectance curve that corresponds to wavelengths shorter than the wavelengths $\lambda_{Y0}$ has a sign which is the same as that of the average inclination of that of the spectral reflectance curve corresponding to the wavelengths longer than the wavelength $\lambda_{Y0}$. Therefore, the reflectivity defined by the wavelength $\lambda_{Y0}$ is excluded. With regard to the maximum, essentially the same discrimination is made.

In accordance with the present embodiment, as described above, correct extremum or extrema can be detected even if incorrect values are included in the measured reflectivities.

Second, the calculation of the film thickness, including the discrimination of extrema described above, will be explained in conjunction with the flow chart of FIG. 14A, which shows details of the calculation step 25 in FIG. 5.

At step S1, the data obtained by the measurement of the spectral reflectance is supplied into the computer 5. Then, at step S2, any maximum max(k), and any minimum min(k) are detected on the basis of comparison of the reflectivity data concerning each measuring point with the reflectivity data concerning adjacent measuring points. On the other hand, from the refractive indices of the media of the film and the substrate, the theoretical maximum reflectivity Rmax and the theoretical minimum reflectivity Rmin are calculated (step S3). On the basis of the theoretical values obtained, reference values or ranges m and L to be used for the sake of discrimination of extrema are determined. For example, $Rmax \times 0.9 = L$ and $Rmin \times 1.1 = m$. This is done at step S4. Then, at steps S5 and S7, discrimination is made of the maximum max(k) and the minimum min(k). If the extremum detected on the basis of the measurement is out of the reference m or L, it is excluded at steps S6 and S8. Further, discrimination is made to steps S9 and S11 as to whether two maxima or two minima are in succession. If they are successive, a correct one (larger one or smaller one) of them is selected at steps S10 and S12. In this manner, one or more correct maxima max(k) and/or one or more correct minima min(k) are determined. By using these extrema, an approximate thickness $d_0$ is calculated at step S13. This calculation is made in accordance with the number and the nature of the extrema obtained.

Next, details of the calculation of the approximate thickness $d_0$ at step S13 will now be described.

Figure 14A:
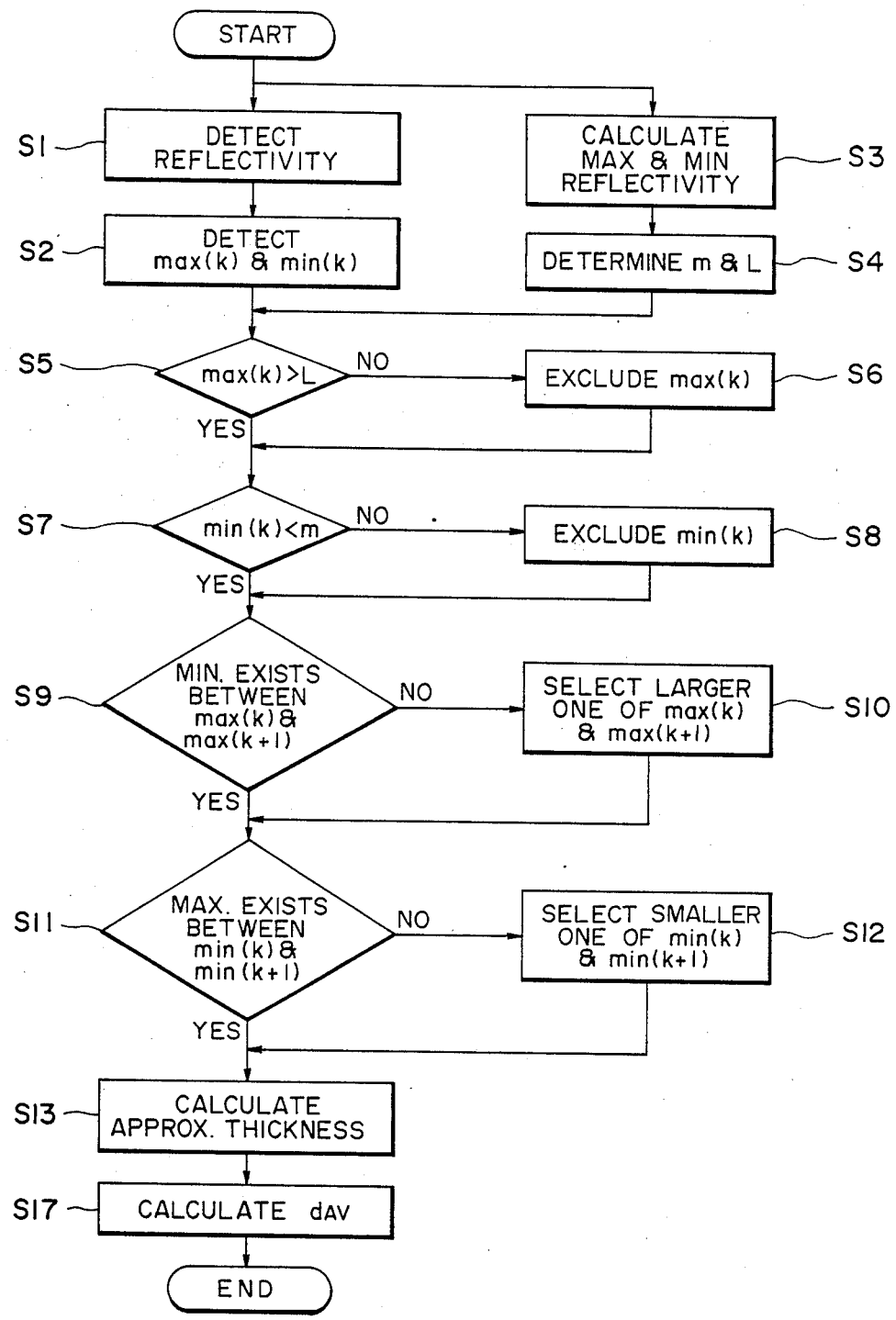
FIG. 14A is a flow chart showing details of the manner of calculation of the film thickness, made in the flow chart of FIG. 5.

As is known in the art to which the present invention pertains and as described in the foregoing, the calculation of the approximate thickness of the film at step S13 in FIG. 14A is performed for the purpose of detecting the value of "N" in equation (3).

When equation (2) is differentiated with respect to the wavelength $\lambda$ in order to detect such value of "$\beta$" that results in $dR'/d\lambda = 0$, then the following is derived:

$$\sin 2\beta = 0 \qquad (2\text{-}2)$$

$$2\beta = N \cdot 2\pi$$

On the other hand, the values of "$\beta_1$" and "$\beta_2$" with respect to the wavelengths $\lambda_1$ and $\lambda_2$ providing maxima, respectively, can be expressed by rewriting the above-described equation:

$$\beta = \frac{2\pi}{\lambda_0} n_2 d \cos\theta_2$$

thus, $\beta_1$ and $\beta_2$ are as follows:

$$\beta_1 = \frac{2\pi}{\lambda_1} n_{21} d \cos\theta_2$$

$$\beta_2 = \frac{2\pi}{\lambda_2} n_{22} d \cos\theta_2$$

wherein $n_{21}$ and $n_{22}$ are refractive indices of the film, being examined, with respect to the wavelengths $\lambda_1$ and $\lambda_2$.

Therefore, from equation (2—2), it follows that:

$$2\beta_1 = 2 \cdot \frac{2\pi}{\lambda_1} n_{21} d \cos\theta_2 = N \cdot 2\pi$$

$$2\beta_2 = 2 \cdot \frac{2\pi}{\lambda_2} n_{22} d \cos\theta_2 = (N+1) \cdot 2\pi$$

Thus, $$2(\beta_2 - \beta_1) = 2 \cdot 2\pi \cdot d\cos\theta_2 \left( \frac{n_{22}}{\lambda_2} - \frac{n_{21}}{\lambda_1} \right) = 2\pi$$

$$d\cos\theta_2 = \frac{1}{2} \cdot \frac{1}{n_{22} \times 1/\lambda_2 - n_{21} \times 1/\lambda_1}$$

Assuming now that $\theta_2 = 0$ (which means perpendicular incidence), the thickness d (more exactly, approximate thickness) is given by the following equation:

$$d = \frac{1}{2} \cdot \frac{1}{n_{22} \times 1/\lambda_2 - n_{21} \times 1/\lambda_1} \qquad (4\text{-}1)$$

With regard to the minima, the approximate thickness d is obtainable in a similar manner from the wavelengths $\lambda_3$ and $\lambda_4$, providing the minima, and from the refractive indices $n_{23}$ and $n_{24}$ with respect to the respective wavelengths. Thus, $$d = \frac{1}{2} \cdot \frac{1}{n_{24} \times 1/\lambda_4 - n_{23} \times 1/\lambda_3} \qquad (4\text{-}2)$$

Also, the approximate thickness is obtainable by use of a maximum and a minimum defined by the wavelengths $\lambda_1$ and $\lambda_3$. Thus, $$d = \frac{1}{4} \cdot \frac{1}{n_{23} \times 1/\lambda_3 - n_{21} \times 1/\lambda_1} \qquad (4\text{-}3)$$

In this manner, the approximate thickness is detectable. That is, by substituting, into any one of equations (4-1), (4-2) and (4-3), the wavelength or wavelengths that provide the aforementioned max(k) and/or min(k), the approximate thickness $d_0$ is detectable.

Figure 14B:
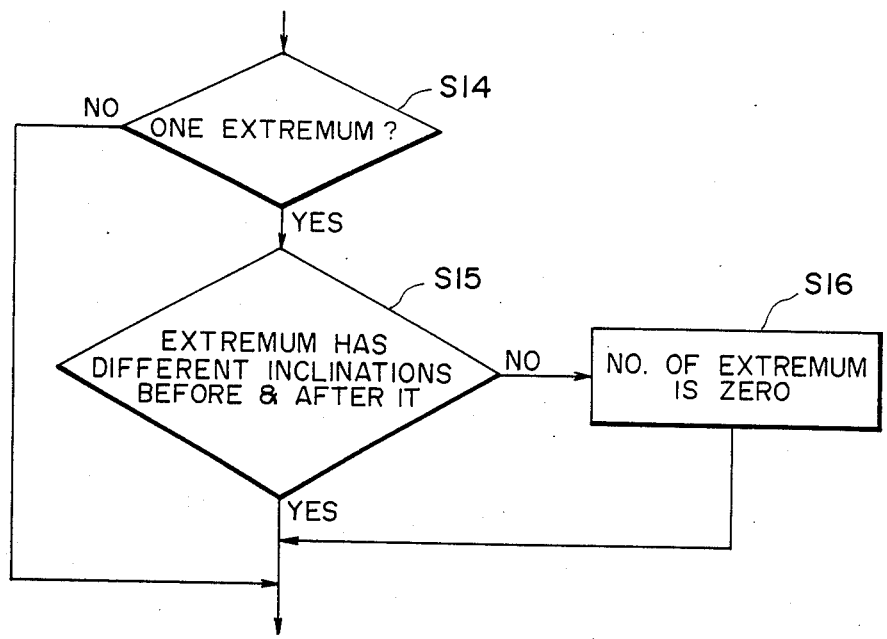
FIG. 14B is a flow chart showing a portion of the thickness calculation to be made where the film is very thin.

If the film being examined is very thin and, accordingly, there is a possibility that the spectral reflectance curve contains only one extremum or less, the operation as illustrated in the flow chart of FIG. 14B and described with reference to FIG. 13 is performed just before the step S13 shown in FIG. 14A. In such case, the approximate thickness d is determined at step S13 as follows:

$$d = \frac{1}{2} \cdot \frac{1}{n_{21} \cdot 1/\lambda_1} \qquad (4\text{-}4)$$

$$d = \frac{1}{4} \cdot \frac{1}{n_{21} \cdot 1/\lambda_1} \qquad (4\text{-}5)$$

Equation (4-4) is used where the wavelength $\lambda_1$ provides a maximum, while equation (4-5) is used where the wavelength $\lambda_1$ provides a minimum.

Where the film being examined is extraordinarily thin so that no extremum is produced, the thickness calculation is not attainable by any one of equations (4-1), (4-2) and (4-3) or by any one of equations (4-4) and (4-5). In view of this, equation (5) is reduced with respect to "d". Thus, $$d = \frac{\lambda}{4\pi \cdot n_2} \left\{ -\phi_{12} + \phi_{10} + 2N\pi + \cos^{-1}\left[\frac{\rho_{01}^2 + \rho_{12}^2 - R(1 + \rho_{01}^2\rho_{12}^2)}{2\rho_{01}\rho_{12}(R-1)}\right] \right\} \qquad (6)$$

where $N \approx 0, 1, 2 \ldots$

Then, at step S13, an approximate thickness d of such very thin film is calculated from a certain wavelength $\lambda$ and a reflectivity R corresponding to this wavelength, while assuming that N=0. It is assumed that N=0 because the film being examined is extraordinarily thin, so that it can be considered that only an interference fringe of "0-th order" is produced.

With regard to the cases described with reference to equations (4-1) to (4-5), wherein at least one extremum is detected, the value (order) of "N" is given by the following equation:

$$N = 1 n_2 d / \lambda \qquad (7)$$

Therefore, by substituting into equation (7) the value of the approximate thickness d obtained in accordance with any one of equations (4-1) to (4-5), the value N is determined.

Thereafter, by substituting into equation (3) or (6) the thus detected value of "N" and each of the measured reflectivities R with respect to different wavelengths, data concerning the thickness d of the film with respect to the different wavelengths are obtained. Then, a calculation is made to determine an average of the thickness data, whereby the average thickness $d_{AV}$ is obtained (step S17). By this, means the film thickness measurement is completed.

A description will now be provided of the measurement of the thickness of a film that has a relatively high light-absorbing property.

Where the film to be examined has a relatively high light-absorbing property, the reflectivity of the film is affected by the light-absorption. An analysis of this problem is made in the aforementioned publication "Principles of Optics", third edition, pages 627-633.

The reflectivity R of such film is given by the following equation:

$$R = \frac{\rho_{12}^2 e^{2\nu_2\eta} + \rho_{23}^2 e^{-2\nu_2\eta} + 2\rho_{12}\rho_{23}\cos[\phi_{23} - \phi_{12} + 2u_2\eta]}{e^{2\nu_2\eta} + \rho_{12}^2\rho_{23}^2 e^{-2\nu_2\eta} + 2\rho_{12}\rho_{23}\cos[\phi_{12} + \phi_{23} + 2u_2\eta]} \qquad (8)$$

wherein $\rho_{12}$ and $\rho_{23}$ are coefficients associated with the amplitude concerning respective interfaces; $\phi_{12}$ and $\phi_{23}$ are coefficient associated with the phase concerning the respective interfaces; and $\nu_2$ relates to the absorption factor of the film which is determined by a complex refractive index $\hat{n}_2$ in accordance with the following equation:

$$\hat{n}_2 \cos \theta_2 = u_2 + i\nu_2 \qquad (9)$$

The values of $\hat{n}_2$, $u_2$ and $\nu_2$ are determined once the medium of the film is determined. In equation (8), $\eta$ is given by:

$$\eta = (2\pi/\lambda_0)d$$

Equation (8) can be rewritten as follows:

$$d = \frac{\lambda_0}{4\pi u_2}\left[-\phi_{12} - \phi_{23} + 2\pi N + \cos^{-1}\frac{Re^{2\nu_2\eta} + R\rho_{12}^2\rho_{23}^2 e^{-2\nu_2\eta} - \rho_{12}^2 e^{2\nu_2\eta} - \rho_{23}^2 e^{-2\nu_2\eta}}{2\rho_{12}\rho_{23}(1-R)}\right] \qquad (10)$$

In equation (10), "$\eta$" at the right-hand side is the function of the thickness d. Therefore, the thickness d can not be directly detected by use of this equation (10). However, with the film thickness measuring technique utilizing the intensity of the interference light reflected from the boundary between the first and second media and reflected from the boundary between the second and third media the measurement of the thickness of the film where it has higher light-absorbing property is not possible unless the thickness d is small, since, if the thickness d is large, the degree of interference is very low, with the result that the reflectivity does not change significantly. In other words, if any reflectivity curve is obtained, it means that the thickness is not so large. Accordingly, the term "$2\nu_2\eta$" used in equation (10) does not have a large value. In view of this, according to the present invention, the value of approximate thickness $d_0$ is substituted into the right-hand side of equation (10). Then, the value obtained by such substitution, as the thickness d, is again substituted into the right-hand side of equation (10). By repeating such a substitution, the value of the thickness d obtained as a result of calculation gradually converges. Finally, as a result, the thickness d of the film can be accurately detected.

Figure 15:
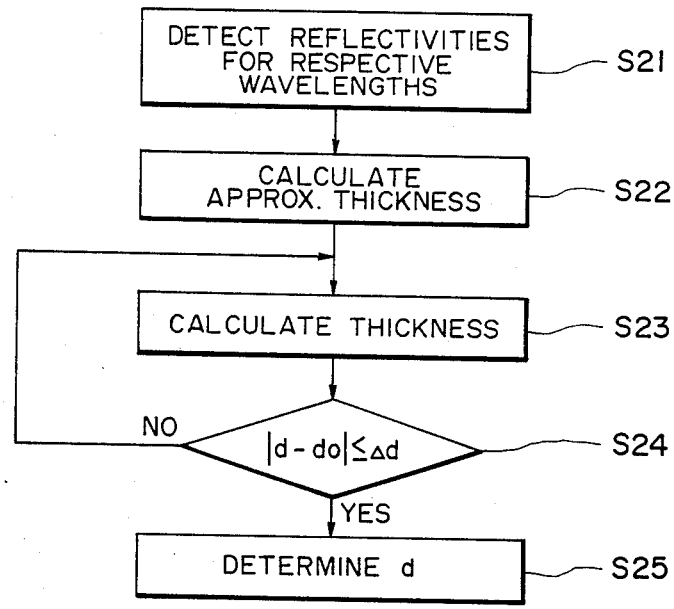
FIG. 15 is a flow chart showing the manner of the film thickness measurement to be made where the film has a light-absorbing property.

Details of such procedure will now be described, in conjunction with the flow chart of FIG. 15.

First, at step S21, the film to be examined is irradiated with light while changing its wavelength, in the manner described hereinbefore. For respective wavelengths, the reflective characteristics of the film are measured. That is, the spectral reflectance is measured. Then, at step S22. approximate thickness of the film is calculated. The calculation of the approximate thickness at step S22 is performed in the manner described with reference to the steps S1-S13 in FIG. 14A. Namely, from the wavelength or wavelengths which provide a maximum value or values, for example, of the reflectivity R in equation (2), the approximate thickness $d_0$ is detected. The thus detected thickness $d_0$ and the value of "N" detected by equation (7) are used. That is, they are substituted into the right-hand side of equation (10). More particularly, for each of different wavelengths, the value of thickness d is calculated. Then, an average of the values of thickness d for respective wavelengths is calculated (step S23). Thereafter, the newly obtained value "d" is compared with the value "$d_0$" having been obtained by the preceding thickness calculation. If the absolute value of the difference between "d" and "$d_0$" is greater than a predetermined value $\Delta d$ which is determined in accordance with the accuracy of measurement required, the value "d" is treated as or substituted for "$d_0$", and the thickness calculation is performed again by using equation (10) again. This is repeated. By doing so, the result of calculation gradually becomes close to the true value of the thickness d of the film being examined. The above described discrimination is made at step S24. If the tolerance $\Delta d$ is not satisfied, the sequence goes back to step S23. If it is satisfied, on the other hand, the sequence goes to step S25 so that the thickness d is determined.

Figure 16:
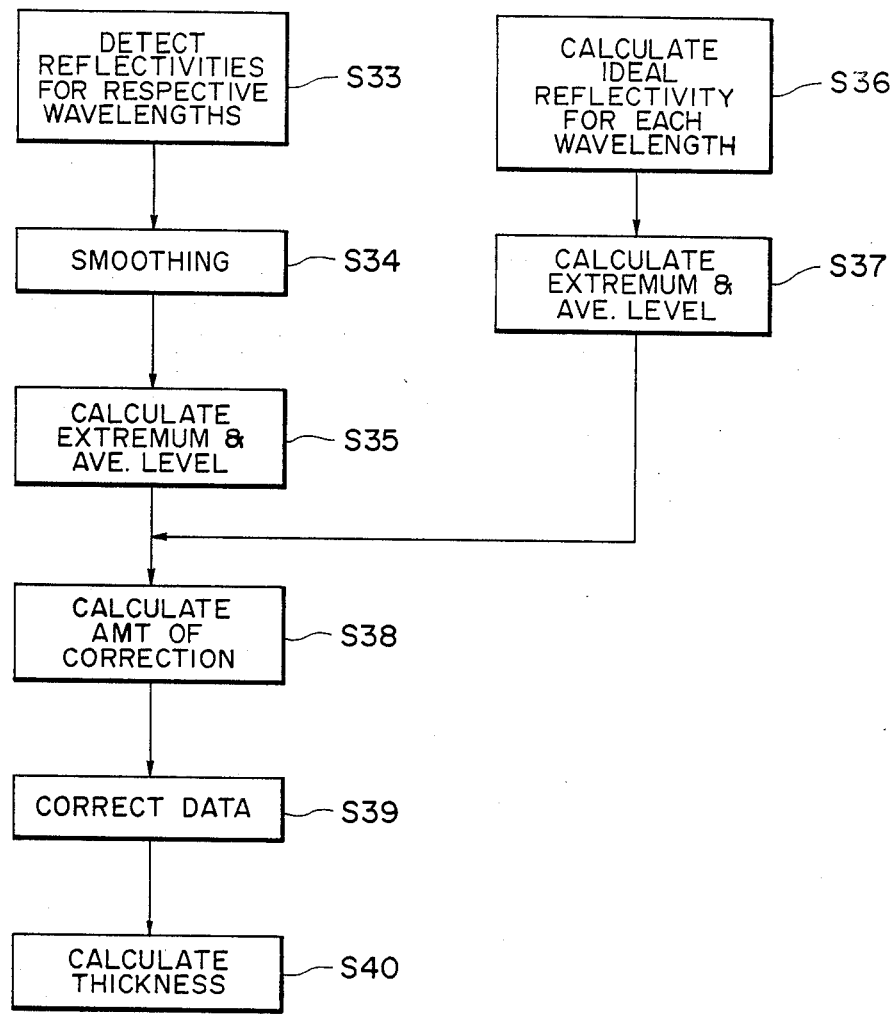
FIG. 16 is a flow chart showing the manner of thickness measurement which is particularly suitable for measuring a gap defined for a liquid crystal layer.

A description will now be provided of another aspect of the present invention. In this aspect, the present invention is applied to the measurement of the thickness or size of a layer which is sandwiched between seprate layers. Typically, the subject of measurement in accordance with the present aspect of this invention is the size of a gap defined for a liquid crystal layer in a liquid crystal display panel.

Where the size or thickness of such a gap or intermediate layer is to be measured, it is expected that the measurement accuracy deteriorates. One of reasons therefor is the existence of light reflected from any interface other than the interfaces of the gap or intermediate layer such as the liquid crystal layer, i.e. the existence of stray light. The present invention, in this aspect, aims at obviating the effect of such stray light upon measurement of the size or thickness of such gap or intermediate layer, to thereby improve the accuracy of measurement. Details will now be described, taken in conjunction with FIGS. 16–18. Of these Figures, FIG. 16 is a flow chart showing the procedure according to this aspect of the present invention. FIGS. 17A–17D show signals obtainable at different stages of the procedure of FIG. 16. The procedure illustrated in FIG. 16 is prepared for the sake of avoiding the effect of the stray light and is performed prior to the thickness measuring sequence described with reference to the flow chart of FIG. 14A.

Figure 17A:
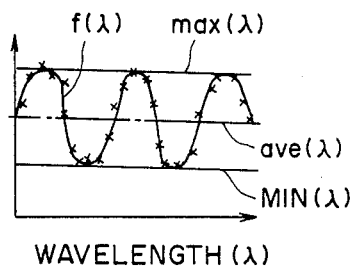
FIGS. 17A-17D are graphs showing the spectral reflectance and the thickness detected in relation to the measurement, in the process of FIG. 16.
Figure 17B:
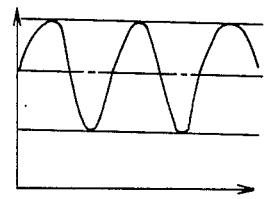
Figure 17C:
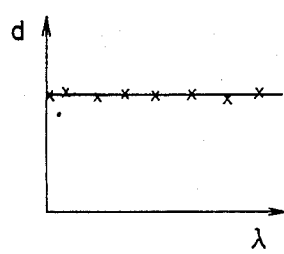
Figure 17D:
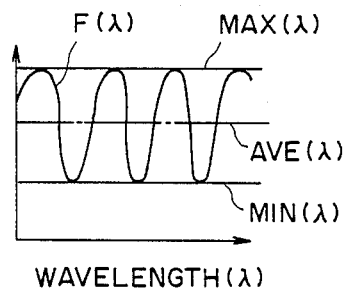
Figure 18:
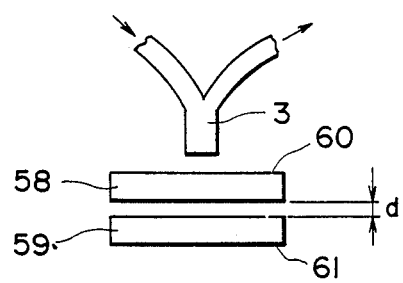
FIG. 18 is a schematic view showing the gap measurement to be performed in accordance with the flow of FIG. 16.

Referring to FIGS. 16 and 17A–17D, the reflectivities with respect to different wavelengths, i.e. the spectral reflectance, are measured in a similar manner as described hereinbefore (step S33). The thus detected data concerning the spectral reflectance is subjected to smoothing (step S34). This is done by use of a high-speed Fourier conversion or the like. In FIG. 17A, the points marked by "x" correspond to the reflectivities measured, and a solid-line curve connecting these points and denoted by $f(\lambda)$ is obtained by the smoothing. The character "f" denotes the function of wavelengths $\lambda$. Thereafter, at step S35, maxima, minima and an intermediate or middle level therebetween of the spectral reflectance curve $f(\lambda)$ are determined. For this purpose, a curve $max(\lambda)$ connecting the dots of maxima and a curve $min(\lambda)$ connecting the dots of minima are determined. Then, an intermediate or middle level $ave(\lambda)$ is detected. Thus, $$ave(\lambda) = \frac{max(\lambda) + min(\lambda)}{2}$$

On the other hand, theoretical values of the reflectance concerning the layer being examined, i.e. the ideal reflectivities with respect to different wavelengths are calculated preparatorily on the basis of the property of the layer being examined (step S36). Thus, an ideal spectral reflectance curve $F(\lambda)$ is obtained. From this curve $F(\lambda)$, a curve $MAX(\lambda)$ connecting dots of maxima in the reflectance curve, a curve $MIN(\lambda)$ connecting dots of minima in the reflectance curve and an intermediate or middle level $AVE(\lambda)$ are determined by calculation (step S37 and FIG. 17B).

Subsequently, a correction is made of the measured spectral reflectance $f(\lambda)$ so as to obtain a spectral reflectance without being substantially affected by the stray light, in accordance with the following equation:

$$f(\lambda) = [f(\lambda) - ave(\lambda)] \times \left[ \frac{MAX(\lambda) - MIN(\lambda)}{max(\lambda) - min(\lambda)} \right] + AVE(\lambda) \quad (11)$$

The correction by equation (11) will be described in more detail. The ideal reflectivity $F(\lambda)$ is one detected with respect to the film whose medium is known. Therefore, the maxima and minima of the spectral reflectance can be determined as theoretical values, independently of the thickness of the layer being examined, as has been described with reference to "Rmax" and "Rmin". The curve connecting the theoretical maxima with respect to different wavelengths, used for the thickness measurement, is the curve $MAX(\lambda)$, and the curve connecting the theoretical minima is the curve $MIN(\lambda)$. If no stray light is included, the actual reflectivity $f(\lambda)$ oscillates in the range between $MAX(\lambda)$ and $MIN(\lambda)$, with the change in the wavelength, regardless of the magnitude of the thickness d. The center of oscillation at this time is at the middle level $AVE(\lambda)$ of the curves $MAX(\lambda)$ and $MIN(\lambda)$. Therefore, even if the curves $max(\lambda)$, $min(\lambda)$ and $ave(\lambda)$ of the measured spectral reflectance $f(\lambda)$ deviate from the curves $MAX(\lambda)$, $MIN(\lambda)$ and $AVE(\lambda)$, respectively, due to the inclusion of the stray light, the actual reflectivities of the layer which is just the subject of measurement can be detected by correcting the data, detected by measurement, so that the characteristics $max(\lambda)$, $min(\lambda)$, $ave(\lambda)$ of the measured spectral reflectance are coordinated with the characteristics $MAX(\lambda)$, $MIN(\lambda)$, $AVE(\lambda)$ of the theoretical spectral reflectance of the layer being examined.

The manner of correction will be described in more detail. First, a bias component of the oscillating reflectance $f(\lambda)$, i.e. the middle level $ave(\lambda)$, which contains an error is removed. Namely, the calculation "$f(\lambda) - ave(\lambda)$" is preformed. The result of the calculation "$f(\lambda) - ave(\lambda)$" directly corresponds to only the amplitude component of the oscillation with varying wavelength. The amplitude component itself contains an error. Therefore, the value determined by the calculation "$f(\lambda) - ave(\lambda)$" is divided by "$max(\lambda) - min(\lambda)$" of the oscillation actually measured with respect to different wavelengths, and, thereafter, the resultant value is multiplied by "$MAX(\lambda) - MIN(\lambda)$" of the theoretical oscillation with respect to the different wavelengths. By doing so, the error in the amplitude component is removed, with the result that the amplitude component substantially corresponds to the theoretical amplitude component. After this, the theoretical bias component, i.e. the theoretical middle level AVE(λ), is added to the result of multiplication. Thus, f'(λ) is obtained. The spectral reflectance curve f'(λ) detected as a result of the above-described procedure now contains the bias component and the amplitude which are concerned with oscillation of the reflectivity associated only with the layer that is the subject of measurement.

It will be readily understood that, in equation (11), the change in gain in the reflectivity data due to the inconveniences described hereinbefore is corrected by the first term of equation (11), while the change in bias component is corrected by the second term. The detection of the errors and the correction thereof are performed at steps S38 and S39 in FIG. 16.

By using the thus determined f'(λ) as the "reflectivity R", the thickness d is calculated in accordance with equation (3) (step S40 and FIG. 17C), whereby the thickness is accurately determined.

Where it is desired to repeatedly execute the measurement for a plurality of samples having substantially the same properties, the correction of the data may be made by using the values of max(λ), min(λ) and ave(λ) determined with reference to the measurement in relation to the first sample. By doing so, the time necessary for the measurement is reduced significantly. For the measurement of N-th sample, the following equation is used (FIG. 17D):

$$f_N(\lambda) = [f_N(\lambda) - ave_1(\lambda)] \times \left[\frac{MAX_1(\lambda) - MIN_1(\lambda)}{max_1(\lambda) - min_1(\lambda)}\right] + AVE_1(\lambda) \quad (12)$$

wherein the suffix 1 is a symbol designating the first-time measurement while the suffix N is a symbol designating the "N-th time" measurement. It is not a requirement that each of the samples, other than the first sample, has exactly the same property as of that of the first sample. What is necessary is that the gain and the bias component can be set for "$f_N$". Thus, as long as the factors which cause deterioration of the measurement accuracy are not substantially changed, no practical problem will occur.

In accordance with this feature of the present invention, the data containing errors is automatically corrected. Therefore, the present invention in this aspect is very effective where deterioration of the measurement accuracy due to the inconveniences such as described hereinbefore is previously expected. For example, the present invention is effectively applicable to the measurement of a gap d (FIG. 8) defined for a liquid crystal layer of a liquid crystal panel device. It is seen from FIG. 8 that, where an upper glass plate 58 and a lower glass plate 59 of the liquid crystal display panel are coupled to each other with a gap d intervening therebetween, the light is reflected also by an upper surface 60 of the upper glass plate 58 and further by a lower surface 61 of the lower glass plate 9. Such reflection light would be received by the reflectance measuring fiber probe 3 and acts as bias light. Such bias component can not be removed without the present invention. According to the above-described feature of the present invention, however, such bias component can be automatically removed by calculation.

While the invention has been described with reference to the structures disclosed herein, it is not confined to the details set forth and this application is intended to cover such modifications or changes as many come within the purposes of the improvements or the scope of the following claims.

What is claimed is:

1. A device, usable with an object having a layer, for measuring the thickness of the layer, said device comprising:
    means for irradiating the object with light of a plurality of wavelengths, said irradiating means having a light-emitting portion disposed opposed to the surface of the object;
    means for detecting the light of the plurality of wavelengths from the object being irradiated by said irradiating means, said light detecting means having a light-receiving portion disposed opposed to the surface of the object and substantially around said light-emitted portion of said irradiating means;
    means for detecting the thickness of the layer of the object in accordance with the detection by said light detecting means; and
    positioning means for positioning the object relative to said light-emitting portion and said light-receiving portion at a distance that corresponds to an extremum of the quantity of light received by said light-receiving portion.

2. A device according to claim 1, wherein said positioning means includes postion detecting means for detecting the position of the object and driving means for moving the object in accordance with the detection by said position detecting means.

3. A device according to claim 1, wherein each of said irradiating means and said light detecting means comprises a plurality of optical fibers.

4. A device, usable with an object having a layer, for measuring the thickness of the layer of the object, said method comprising the steps of:
    irradiating the object with light of a plurality of wavelengths;
    measuring the spectral reflectance associated with the object irradiated with the light, the spectral reflectance oscillating with a change in the wavelength of the light;
    correcting the amplitude and the center of the oscillation of the spectral reflectance measured, in accordance with a property of the layer of the object; and
    determining the thickness of the layer in accordance with the corrected spectral reflectance.

5. A method according to claim 4, wherein said correcting step comprises the steps of removing a bias component of the oscillation; correcting the amplitude of the oscillation so that it becomes substantially equal to that detected on the basis of the property of the layer; and adding to the result of correction a bias component detected on the basis of the property of the layer.

6. A device, usable with an object having a layer, for measuring the thickness of the object, said method comprising the steps of:
    irradiating the object with light of a plurality of wavelengths;
    detecting the light of a plurality of wavelengths from the irradiated object;

calculating, first, the approximate thickness of the layer on the basis of the detection of the light from the object; and calculating, second, the thickness of the layer on the basis of the approximate thickness determined by the first calculation step;

wherein said second calculation step is repeated while using the thickness calculated in said second calculation step itself as an approximate thickness for calculating a new thickness of the layer, until the difference between the result of the last calculation performed by repeating said second calculation step and the result of the penultimate calculation is not greater than a predetermined value.

7. A method, usable with an object having a layer, for measuring the thickness of the layer of the object, said method comprising the steps of:

irradiating a first portion of the object with light of a plurality of wavelengths;

detecting the light of a plurality of wavelengths from the first portion of the object being irradiated;

irradiating a second portion of the object with light of a plurality of wavelengths;

detecting the light of a plurality of wavelengths from the second portion of the object being irradiated; and determining the thickness of the layer with respect to the first portion thereof on the basis of the detection of the light from the first portion, during a time period in which the second portion of the object is irradiated.

8. A method, usable with an object having a layer, for measuring the thickness of the layer of the object, said method comprising the steps of:

irradiating the object with light of a plurality of wavelengths;

detecting the intensity of each wavelength of the light from the object being irradiated;

selecting at least one of the detected intensities that satisfies one of first and second predetermined conditions, wherein said first predetermined condition is that the light intensity at its extremum is larger than a first reference value and wherein said second predetermined condition is that of the light intensity at its extremum is smaller than a second reference value; and determining the thickness of the layer on the basis of said at least one selected intensity and the wavelength corresponding to said selected intensity.

* * * * *

UNITED STATES PATENT AND TRADEMARK OFFICE
CERTIFICATE OF CORRECTION

PATENT NO. : 4,787,749
DATED : November 29, 1988
INVENTOR(S) : MIKICHI BAN, ET AL.

It is certified that error appears in the above-identified patent and that said Letters Patent is hereby corrected as shown below:

COLUMN 2

Line 16, "light-emitting portion and" should read --the light-emitting portion and the--.
    Line 31, "principle" should read --principal--.

COLUMN 6

Line 66, " "irregular fiber probe"." should read --"irregular type fiber probe".--.

COLUMN 8

Line 8, "an" should read --a--.
    Line 10, "displaced" should read --is displaced--.

COLUMN 13

Line 46, "$N=1n_2d/\lambda$" should read --$N=2n_2d/\lambda$--.

UNITED STATES PATENT AND TRADEMARK OFFICE
CERTIFICATE OF CORRECTION

PATENT NO. : 4,787,749

DATED : November 29, 1988

INVENTOR(S) : MIKICHI BAN, ET AL.   Page 2 of 2

It is certified that error appears in the above-identified patent and that said Letters Patent is hereby corrected as shown below:

COLUMN 18

Line 33, "postion" should read --position--.

COLUMN 20

Line 21, "of" should be deleted.

Signed and Sealed this

Nineteenth Day of December, 1989

Attest:

JEFFREY M. SAMUELS

Attesting Officer   Acting Commissioner of Patents and Trademarks